March 11, 1958  V. W. PETERSON  2,826,255
PROPELLER DRIVES
Filed June 14, 1951  2 Sheets-Sheet 1

Inventor
Victor W. Peterson
By Willits, Helwig & Bailio
Attorneys

United States Patent Office 2,826,255
Patented Mar. 11, 1958

2,826,255

PROPELLER DRIVES

Victor W. Peterson, Indianapolis, Ind., assignor to General Motors Corporation, Detroit, Mich., a corporation of Delaware Application June 14, 1951, Serial No. 231,465

18 Claims. (Cl. 170—135.75)

This invention relates to propeller drives, more particularly to a multi-engine drive for a dual counterrotating propeller with a brake. This application is a continuation-in-part of my copending application Serial No. 128,427, filed November 19, 1949, now abandoned. The invention as illustrated herein may be described briefly as follows to explain the general nature thereof.

Two gas turbine engines drive a featherable propeller of the dual counterrotating type, the two wheels of the propeller being driven by a common reduction gear which, in turn, is driven by the two gas turbine engines through individual clutches. The specific character of the engines, the propeller, and the reduction gear by which power is transmitted from the engines to the propeller is immaterial, since the invention is applicable to various types of engines, propellers, and reduction gears.

The invention is concerned primarily with a brake for the propeller and the mechanism for actuating the brake. The brake mechanism comprises a conical drum and a conical shoe which are urged toward braking engagement by a spring and are disengaged by hydraulic pressure acting on a piston. The brake is self-energizing in the reverse direction of rotation of the propeller but not in the normal or forward direction of rotation. In other words, forward rotation of the propeller at low speed does not of itself increase the force of engagement of the brake, but any rotation of the propeller in a backward direction does increase the force of engagement of the brake. The hydraulic fluid under pressure which is employed to release the brake is supplied by a pump which is driven alternatively by the propeller or by the gas turbine.

An object of the invention is to provide a multi-engine drive for a propeller with a brake to hold the propeller stationary when it is not driven by the engines and is feathered.

Another object of the invention is to provide a multi-engine drive for a propeller having a clutch between each engine and the propeller drive and a brake mechanism connected to the propeller to prevent rotation of the propeller when it is feathered and the clutches are disengaged or the engines are inoperative.

A further object of the invention is to provide a propeller brake with an arrangement to apply the brake with a controlled actuating pressure when the propeller rotates in the normal direction and to apply the brake with a self-energizing force when the propeller rotates in the reverse direction.

The manner in which these and other objects are accomplished and the nature of the invention will be fully apparent from the succeeding detailed description of the preferred embodiment of the invention and the drawings thereof in which.

Power plant

Figure 1:
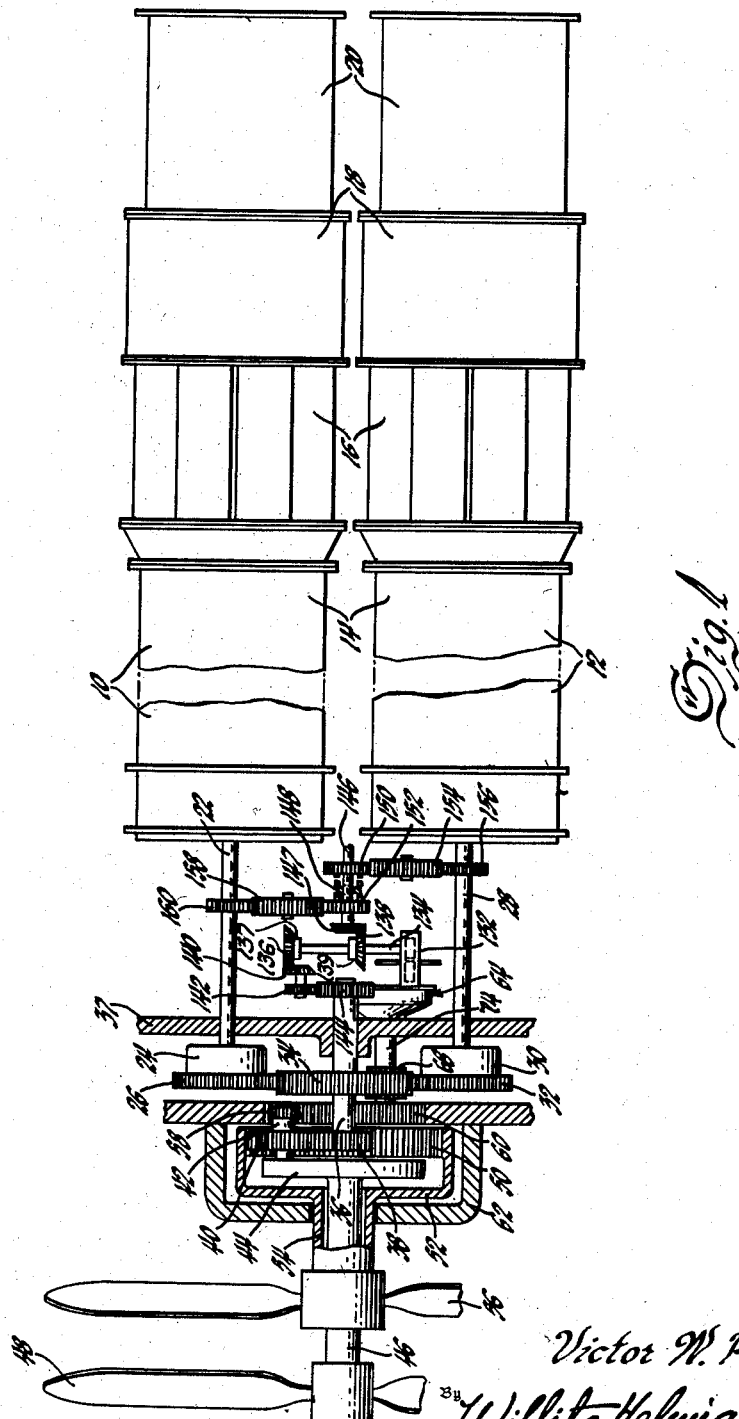
Figure 1 is a schematic diagram of the power plant.

Referring first to Figure 1, there is illustrated a power plant comprising two axial flow compressor turbine internal combustion engines 10 and 12. Each engine includes a compressor 14, a combustion section 16, a turbine 18, and an exhaust cone section 20. These engines may be of any suitable type; the internal structure thereof is immaterial to the invention and therefore is not described. A shaft 22 driven by engine 10 extends forwardly from the engine to a clutch 24 by which it is coupled to a gear 26. Similarly, engine 12 drives shaft 28 connected by clutch 30 to a gear 32. In normal operation, when the respective clutches are engaged, gears 26 and 32 transmit power from the engines to a gear 34 meshing with gears 26 and 32. Gear 34 is mounted on a rotatable shaft 36 supported in the reduction gear housing part indicated schematically as 37. A sun pinion 38 fixed on the forward end of shaft 36 meshes with planet pinions 40 fixed to pinion shafts 42 rotatably mounted in a spider 44. This spider is fixed to the shaft 46 which drives the forward featherable propeller wheel 48. Pinions 40 also mesh with an internal gear or ring gear 50 which is fixed to a flange 52 fixed on the outer propeller shaft 54 which drives the rear featherable propeller wheel 56. The shafts 42 on which planet pinions 40 are fixed also have fixed on them planet pinions 58 which mesh with a ring gear 60 integral with or fixed to a part of the reduction gear case which is indicated as 62.

This type of reduction gear, which serves to drive two shafts in opposite directions from a common input, is known. The character of the reduction gear is immaterial so far as the present invention is concerned except as particularly pointed out hereinafter. It is, of course, necessary that the reduction gear provide some means for coupling the propeller to the brake. As illustrated in Figure 1, the propeller brake 64 comprises a rotatable shaft 74 on which is fixed a pinion 68 which meshes with the gear 34, which gear is coupled to the propeller as previously described and therefore rotates with it.

Propeller brake structure

Figure 2:
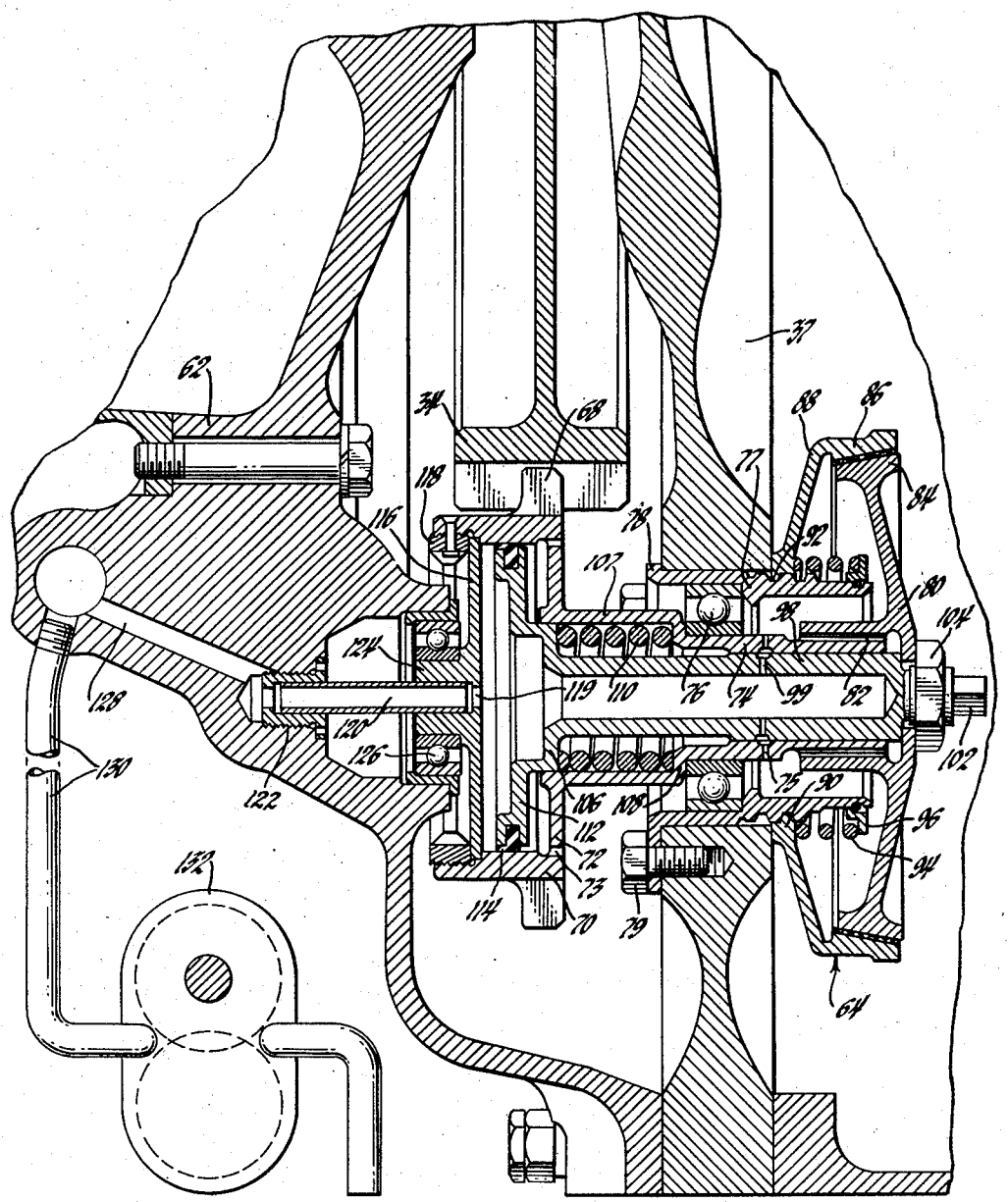
Figure 2 is a sectional view through a portion of a reduction gear housing showing the structure of the propeller brake.

Before considering the energization and operation of the brake in detail, it is best to describe the preferred structure of the brake with reference to Figure 2. As will be apparent, Figure 2 shows in structural form the web or plate 37, and the reduction gear case structure 62 shown schematically in Figure 1, as well as the gear 34 which is rotatably mounted in these parts and the brake drive pinion 68 meshing with gear 34. Pinion 68 consists of suitable gear teeth extending from the exterior of a hydraulic cylinder 70, which cylinder serves to release the brake, as will be subsequently explained. The cylinder comprises an annular end wall 72 which is integral with the outer wall 70 and with the shaft 74 mounted for rotation in a ball bearing 76 mounted in a support sleeve 78. Sleeve 78 is fitted in an opening in the web 37 by cap screws 79 passing through ears extending from the sleeve 78 and threaded into the reduction gear case web 37. A shoulder 77 on the interior of sleeve 78 abuts the outer race of bearing 76. The drive shaft 74 is of stepped construction and defines a radially extending flange or abutment 108 which bears against the inner race of the ball bearing 76. The assembly comprising shaft 74, cylinder 70, and gear 68 are also supported for rotation at the left end of the assembly as viewed in Figure 2 by a ball bearing 126 which is supported in part 62 of the reduction gear case and has piloted herein a boss 124 of a cylinder head plate 116 which plate is coaxial with shaft 74 and is mounted in the cylinder 70. Plate 116 abuts a shoulder within the cylinder 70 and is retained by an externally threaded ring 118 threaded into the interior of cylinder 70 and bearing against the outer or leftward face of plate 116. It will thus be seen that cylinder head 116 including boss 124, cylinder 70, gear 68, and shaft 74 constitute a unitary rotating assembly mounted for rotation in the reduction gear case but held against axial movement by ball bearings 76 and 126.

The brake per se comprises a rotatable brake disk 80 which turns with brake drive shaft 74 and a brake drum 86 which, for the moment, may be considered as stationary, although it may rotate and shift axially to a limited extent. Brake disk 80 is mounted on shaft 74 by splines 82 which provide for axial movement of the disk relative to the shaft but insure concurrent rotation or cessation of rotation thereof. The brake disk has at its periphery an annular brake shoe 84, the outer surface of which is a frustum of a cone having its apex to the left as viewed in Figure 2. Brake drum 86 has an interior conical surface complementary to the exterior surface of brake shoe 84. Brake drum 86 is supported by an inwardly extending flange 88 at the inner margin of which is a helically threaded or cam member 90 which is in threaded engagement with a mating helical thread or cam 92 on the outer cylindrical surface of bearing support sleeve 78 rigidly mounted on reduction gear frame member 37. The face of flange 88 is shown in engagement with the face of plate 37, which is its normal position. A coil spring 94 surrounds sleeve 78 and is held between the outer or right hand face of flange 86 and an abutment 96 fixed on sleeve 78. As will be apparent, since flange 88 is threadedly mounted by its internal thread 90 on the external thread 92 of sleeve 78, rotation of the brake drum 86 in the appropriate direction will move the drum 86 and flange 88 to the right in Figure 2 along the axis of sleeve 78 and shaft 74. However, spring 94 urges the flange 88 toward and into engagement with the wall 37, as illustrated in Figure 2.

The device includes structure by which brake shoe 84 mounted on disk 80 is movable axially relative to shaft 74 and drum 86. This structure comprises a piston rod 98 integral with a piston 112 reciprocable within cylinder 70 and fixed at the end remote from the piston to brake disk 80. The piston rod 98, which is hollow for the greater part of its length, is closed at its outer end 102 and is threaded to receive a nut 104 which clamps the center of brake disk 80 against a shoulder of the piston rod, thereby fixing brake disk 80 to piston rod 98 and piston 112. The right end portion of piston rod 98 is a sliding fit within the bore of brake shaft 74 and the piston rod is joined to the piston by a shoulder or step 106 which is slidably piloted within an enlarged portion 107 of the brake shaft. An annular cavity is defined between this enlarged portion 107 and the piston rod, the ends of which are defined by the step 106 on the piston rod and the step 108 of the shaft. A coil compression spring 110 mounted within this cavity engages the two shoulders, thereby urging piston 112, piston rod 98 and brake disk 80 to the left as viewed in the figure, which is the direction in which, due to the conical form of the brake shoe and brake drum, the brake disk 80 moves to engage the brake. Thus, spring 110 provides a force continually urging the brake into engagement.

The brake is released by oil pressure exerted against the left face of piston 112 by oil within cylinder 70. A seal 114 is mounted around the rim of the piston to provide an oil seal, and bleed holes 73 are provided through the web 72 at the junction with cylinder wall 70 to prevent trapping of oil or air to the right of the piston. Oil is introduced into the cylinder 70 through a central opening 119 in cylinder head plate 116 within which is piloted a tube or conduit 120 mounted in a fitting 122 screwed into the portion 62 of the housing. The disk 116, which rotates with the cylinder 70, is rotatable on the tube 120. The end of tube 120 is in direct connection through the open end of bushing 122 with a passage 128 in the reduction gear case to which oil is supplied through a pipe 130 by a reduction gear oil pump 132. The manner in which pump 132 is driven will be described subsequently, but it will be apparent at this point that, whether or not gear 68 is rotating, if oil is introduced into cylinder 70 under sufficient pressure to overcome the thrust of spring 110, the piston, piston rod, and brake disk will slide to the right to release brake shoe 84 from brake drum 86.

Radial oil passages 99 in the piston rod 98 and passages 72 and in the brake shaft 74 are in communication when the brake is engaged to bleed off some oil from the cylinder 70 through the hollow piston rod, which oil enters the space between brake drum flange 88 and brake disk 80, being slung outward by centrifugal force as the parts are rotating, so that it lubricates the rubbing brake surfaces as the brake is engaged.

Oil pump drive

We may now consider the provisions for driving oil pump 132. This is the subject matter as to which this application includes an illustration not included in the drawings of the parent application, Serial No. 128,427. As stated in that application, "This pump is preferably driven from the engine drive shafts 22 and 28 and from the propeller shafts or reduction gearing on the other side of the main clutches 24 and 30 through one way or overrunning clutches at each connection. When the engine 10 is started by a starter, the lubricating oil pump 132 creates sufficient pressure to move the piston 112 to the right to compress the spring 110 and release the brake before any engine is clutched to the reduction gear 34. When the pilot desires to make an air start, the propeller is unfeathered to provide sufficient torque at flying speeds to overcome brake drag. The oil pump 132 is driven through an over-running clutch from the reduction gear side of the main clutch and the brake is quickly released. The propeller continues to increase in speed until the engine can be started. Then one of the main clutches 24 or 30 is engaged."

Amplifying this disclosure in terms of the illustration of suitable mechanism therefor in Figure 1, oil pump 132, which may be of any suitable type, is driven by a shaft 134 which may be driven either through bevel gear 136 and one-way clutch 137 or through bevel gear 138 and one-way clutch 139. The one-way clutches provide, in known manner, an over-running connection so that the pump shaft 134 is driven by either gear 136 or 138, whichever is being driven at the greater rate. Gear 136 is driven by bevel gear 140 on a common shaft with pinion 142 which meshes with gear 144 fixed to shaft 36 of the reduction gear which is directly geared to and rotates with the propeller. Bevel gear 138 may be driven by either gas turbine 10 or 12 through a selective connection to their respective output shafts 22 and 28. Gear 138 is driven by bevel gear 147 fixed on a shaft 146 which is clutched either to gear 150 or gear 152 by a suitable selective clutch 148. Gears 152 and 150 are rotatable on the shaft, whereas clutch member 148 is splined to the shaft so that the shaft must rotate with it. Therefore, by shifting clutch member 148 axially of the shaft into clutching engagement with either of the gears 150 and 152, shaft 146 is constrained to rotate with that gear. Gear 150 is constantly coupled to output shaft 28 by idler gear 151 which meshes with gear 150 and with gear 156 fixed on shaft 128. Gear 152 is similarly constantly coupled to shaft 22 through idler gear 158 and gear 160 on shaft 22.

Shaft 146 may be driven by a starter for the power plant which is coupled to either engine 10 or engine 12 by the clutch member 148, as set out more fully in the copending application Serial No. 147,268 of Victor W. Peterson and Herbert H. Schnepel, filed March 2, 1950 (now abandoned) and in the continuation-in-part thereof, Serial No. 174,052, filed July 15, 1950. However, so far as the present invention is concerned, it is immaterial whether shaft 146 is connected to the starter or not, as long as it provides means to couple pump drive gear 138 to one of the power units 10 and 12.

Summing up the pump drive, it will be apparent that pump 132 will be driven by the propeller working backward through the reduction gearing to drive sun gear shaft 36, gear 144, pinion 142, gears 140 and 136, one-way clutch 137, and shaft 134 if the propeller is rotating and the engines are not. It will also be apparent that if engine 10 is coupled by clutch 148 to shaft 146 there will be a drive train from engine 10 through shaft 22, gear 160, gear 158, gear 152, clutch 148, shaft 146, gear 147, gear 138, one-way clutch 139, and shaft 134. Engine 12 is similarly coupled if clutch 148 is shifted. If both the propeller and the power unit are rotating, whichever tends to drive shaft 134 at the highest speed will drive it and the one-way clutch in the other drive train will freewheel.

Centrifugal force effect

All of the structure has now been set out, but one more fact may well be adverted to before entering into a description of the operating sequence of the mechanism. It is well known that oil or other liquid confined in a chamber such as that constituted by cylinder 70, cylinder head 116 and piston 112, which rotates when gear 68 is rotated by gear 34 (that is, when the propeller is rotating) will rotate with the chamber and, because of centrifugal force, the oil will be urged radially outwardly from the axis of rotation. Such rotation therefore generates a pressure on the oil in the chamber due to centrifugal force, which pressure increases from the axis to the outer boundary of the chamber. The force urging the piston axially due to this pressure is determined by the outer and inner radii of the chamber, by the density of the fluid, and by the speed of rotation. Therefore, when oil is contained in the cylinder 70 and the cylinder is rotated, the rotation of the oil will generate a pressure which varies from the axis to the margin and which is superimposed upon any static pressure available by transmission from the pump 132 through pipe 130, passage 128, and conduit 120. It is well known that aircraft propulsion installations incorporating propellers, and particularly gas turbine propeller combinations, have a normal operating speed range determined by the characteristics of the propeller and engine. Of course, the reduction gear ratio provides for matching a suitable rotational speed for the engine with a suitable rotational speed for the propeller. With a cylinder 70 of given dimensions and a given set of reduction gears and with oil of a given specific gravity, the axial force exerted on piston 112 by the centrifugal force effect of the oil in the cylinder is directly dependent upon the speed of rotation of the propeller and, in fact, increases as the square of the speed of the propeller. In the installation according to the preferred embodiment of the invention the diameter of cylinder 70 is such that, with the cylinder rotating at the speeds at which it rotates in normal operation of the propeller to propel the aircraft, the centrifugal force acting on the oil will create sufficient hydraulic pressure to overcome the thrust or bias of spring 110 and hold the brake disengaged without any assistance from the static pressure supplied by the pump 132. Thus, a failure of oil pressure will not permit engagement of the brake unless the propeller is decelerated to a point at which it is safe to apply the brake. This is an important safety factor of the invention.

Operation

It is believed that the operation of the structure will be clear from the foregoing, but a resumé of the operation in connection with the operation of the power plant may be desirable.

In this connection it may be pointed out that a structure of the clutches 24 and 30, suitable means for engaging and releasing the clutches, and a discussion of the way in which they are used, has been set out in the copending applications Serial Nos. 147,268 and 174,052, previously mentioned. However, so far as the present invention is concerned, these matters are immaterial, and it is sufficient to realize that the clutches may be engaged or disengaged so that either or both power units may be coupled to the propeller through the reduction gear.

Assuming that the aircraft is on the ground and the engines are dead, the power plant may be put into operation by starting the power units 10 and 12. It is contemplated that either unit be started first and, as previously described, the starting shaft 146 may be clutched to either unit for this purpose. Since it is undesirable to load the starter or engine with the propellers in starting, before either unit is started the power clutches 24 and 30 are disengaged. Let us then assume that engine 10 is first started. When the starter begins to turn the engine over and continuing after the engine becomes self-sustaining, oil pump 132 is driven from shaft 146, first by the starter and then by the engine. As the engine develops speed, the oil pressure builds up, and, before the engine reaches the operational speed at which it is coupled to the propeller, the oil pump 132 has generated sufficient pressure so that oil transmitted from the pump through lines 138, 120 and 122 to cylinder 70 will exert sufficient force on piston 112 to overcome the force of spring 110 and move piston rod 98 and brake drum 80 to the right, releasing the brake. The hub of the brake drum slides on drive shaft 74 by virtue of splines 82.

Clutch 24 may now be engaged so that the operating power unit brings the propeller up to speed. Since the brake is held off by oil pressure as described, it does not oppose the starting of the propeller by the power unit. As will be apparent, engaging clutch 30 at this point will enable the operating power unit 10 to crank the power unit 12 through gears 26, 34 and 32. Alternatively, clutch 148 could be shifted to allow unit 12 to be started by the starter. If this is done, the drive of pump 132 will be continued through the gear train from reduction gear shaft 36 through gears 144, 142, 140 and 136 and one-way clutch 137. As will be apparent, with the clutches 24 and 30 engaged, the speed ratio of gear 136 to gear 138 is fixed, since both are coupled (through separate drive trains) to the engine shaft 22 or 28. The gear ratios are preferably such that pump 132 is driven by the propeller through clutch 137 and clutch 139 overruns slightly.

With the propeller driven in the range of speeds used for takeoff and normal flight, cylinder 70 is rotated at such speed that the thrust therein due to centrifugal force of the oil is greater than the thrust of spring 110, a result which is a function of the density of the oil, the diameter of the piston, and the speed of rotation, the values of the latter two of which may easily be made suitable by elementary calculation. Therefore, even if there should be a failure of the drive to the oil pump or a failure of the oil lines, for example, the spring cannot put the brake on until the propeller has slowed down sufficiently to make it safe for the brake to be applied without risk of damage to the brake or to the parts of the reduction gear.

Assuming it should be desired to shut down in flight one power plant of a multiple power plant installation, the propeller would, as is customary, be feathered. The feathering mechanism is a part of the propeller, which part is not illustrated since it may be of any suitable type and the details or type thereof are immaterial to this invention. Feathering simply consists in increasing the pitch of the propeller to the point at which it generates no torque due to the apparent wind, or preferably, in the installation under discussion, slightly beyond this point so that the propeller tends to rotate in the reverse direction. Both these values of pitch are very nearly the same. As used in the claims, reference to a feathered condition of the propeller means a condition in which the pitch of the blades is approximately 90 degrees so that the propeller generates only a small torque under the action of apparent wind. Of course, as long as the propeller or the power unit to which shaft 146 is clutched is rotating above a sufficient speed to generate static oil pressure in pump 132 sufficient to overcome brake engaging spring 110, the brake will not engage. However, if the power plant is shut down and the propeller is feathered, whether or not clutches 24 and 30 are disengaged, rotation of the propeller will substantially cease and the brake will engage to hold the propeller against rotation.

The action of the brake when the propeller is rotating in the normal direction is less severe than when the propeller tends to rotate in the reverse direction because of the self-energizing feature of the brake. In the normal or forward direction of rotation of the propeller friction of brake shoe 84 against brake drum 86 urges drum 86 in such direction that the threaded hub is screwed to the left on the threaded support 78 into engagement with the wall 37. The brake drum thus is in the position axially of the shaft 74 shown in Figure 2. In this position, with the brake engaged, spring 110 is extended to a certain degree and exerts a certain amount of force (dependent upon the characteristics of the spring) to engage the brake. The frictional torque of the brake is, of course, dependent upon the engaging force. It would not be desirable for the frictional torque of the brake to be so great as to generate undue strains in the reduction gear or overheat the brake. However, the ability of the brake to oppose any rotation of the propeller once the propeller is secured is increased by the self-energizing feature which comes into action only in reverse rotation. If the propeller is overfeathered as described so that the apparent wind tends to rotate it reversely, friction between brake shoe 84 and brake drum 86 tends to rotate the drum in such a direction as to move it to the right on the threads or cam 92. The farther the drum rotates and thus moves to the right, the farther brake shoe 84, disk 80 and piston rod 98 are moved to the right with it. This movement compresses spring 110, increasing the engaging force. The reverse rotation of drum 86 may be limited by any suitable stop.

If the power plant is to be started in flight, the propeller is, of course, unfeathered and the torque developed by the wind acting upon the propeller will rotate it forwardly. The initial rotation will carry drum 85 in the forward direction with disk 80 until it is moved back on threads 92 into engagement with wall 37 so that the added energization of the brake is terminated. Propeller torque is sufficient at this point to overcome brake friction and the propeller will accelerate. Since pump 132 is driven by the propeller through the mechanism previously described, as soon as the propeller develops sufficient speed to provide any oil pressure from pump 132, this pressure acting against piston 112 opposed spring 110 and decreases brake engaging force. Thus, as the propeller speeds up and the static pressure from the pump increases, the brake force diminishes until it becomes zero at some point dependent upon the design constants of the installation.

The effect of centrifugal force at the brake release speed is also a matter of the design of the installation. The primary function of the centrifugal force is to prevent application of the brake notwithstanding loss of static pressure from the pump when the propeller is turning over at any speed above that desirable for brake application. The air will brake a feathered propeller turning at substantial speed.

If the plane lands and the power plant is shut down, there will be no oil pressure due to engine pressure or propeller rotation to hold the brake disengaged and the spring 110 will hold the brake on to prevent idle spinning of the propeller with the plane parked.

Conclusion

The advantages of the invention will be apparent to those skilled in the art from the foregong detailed description of the preferred embodiment. As will be apparent, many modifications of structure may be made within the principles of the invention by the exercise of skill in the art.

I claim:

1. In a brake, a brake shoe member, a brake drum member, means to move one of said members toward the other to apply the brake, fluid means connected to said members to move one of said members away from the other to release said brake including a cylinder and piston rotatable with one of said brake members, said cylinder and piston having a diameter sufficient that centrifugal force will act on the fluid in the cylinder to hold the brake in released position when the member is rotating operating speeds above a predetermined speed which would make brake application dangerous.

2. A brake comprising, in combination, a fixed support, a brake drive shaft rotatably mounted in said support, a control member slidably mounted on said drive shaft, a cylinder on said drive shaft, a piston in said cylinder connected to said control member, a shoe controlled by said member and connected to said drive shaft for rotary driving and axial sliding engagement, a drum for engagement with said shoe, said drum being supported on said support, means engaging said drive shaft and member to actuate said brake, and means to supply fluid pressure to said cylinder to release said brake.

3. A brake comprising, in combination, a support tube, a brake drive shaft rotatably mounted in said support tube, a control member slidably mounted within said drive shaft, a cylinder coaxially mounted on one end of said drive shaft, a piston in said cylinder connected to the control member, a brake support on said member and splined to said drive shaft for rotary driving and axially sliding engagement, a brake shoe on said support, a drum for engagement with said shoe, said drum being supported on said support tube, interengaging cam surfaces on said support tube and drum to move the drum toward the shoe when the shoe rotates in one direction and to hold the drum stationary when the shoe rotates in the other direction, means engaging said drive sleeve and member to actuate said brake, and means to supply fluid pressure to said cylinder to release said brake.

4. A brake comprising, in combination, a support, a brake drive shaft rotatably mounted in said support, a control member slidably mounted on said drive shaft, a cylinder on said drive shaft, a piston in said cylinder connected to said control member, a brake shoe secured to said member and engaging said drive shaft for rotary driving and axially sliding engagement, a drum for engagement with said shoe, said drum being supported on said support, interengaging means on said support and drum to move the drum toward the shoe when the shoe rotates in one direction and to hold the drum stationary when the shoe rotates in the other direction, means engaging said drive sleeve and member to actuate said brake, and means to supply fluid pressure to said cylinder to release said brake.

5. In a propeller drive, a featherable propeller including means operable to overfeather the propeller, drive mechanism connected to said propeller to rotate said propeller, a brake connected to said propeller drive mechanism to stop rotation of said propeller, brake applying means operatively connected to said brake to apply said brake, and means connected to said brake applying means and actuated by reverse propeller rotation to increase the braking force in response to reverse propeller rotation.

6. In a propeller drive, a propeller, a brake connected to said propeller, brake applying means connected to said brake to apply said brake, means connected to said brake applying means actuated by reverse propeller rotation to increase the braking force in response to reverse propeller rotation, power means connected to said brake to hold said brake in released position, and means connected to said brake and actuated by rotation of said brake above a predetermined speed to prevent brake application.

7. In a propeller drive, a propeller, a brake connected to said propeller, a power plant, a clutch connecting said power plant to said propeller, means connected to said brake to operate said brake when the propeller rotates in the normal direction and the reverse direction, self-energizing means responsive to reverse propeller rotation connected to said brake providing additional power to operate the brake when the propeller rotates in the reverse direction, and means connected to said brake and said power plant responsive to power plant operation to hold said brake released.

8. In a propeller drive, a propeller, a brake connected to said propeller, means connected to said brake to operate said brake when the propeller rotates in the normal direction and the reverse direction, self-energizing means responsive to reverse propeller rotation connected to said brake providing additional power to operate the brake when the propeller rotates in the reverse direction, power means connected to said brake to release said brake, and means connected to said brake and responsive to high speed propeller rotation to hold said brake in released position on failure of said power means during high speed rotation of said brake.

9. In a brake, a brake shoe, a brake drum, said brake shoe and brake drum being mounted for relative rotary movement about an axis, brake applying means connected to said brake shoe to move said shoe into engagement with said drum, and means connected to said drum to move the brake drum axially of said axis to increase the braking force responsive to the relative direction of rotation of said brake shoe and brake drum.

10. In a brake, a conical brake shoe, a conical brake drum coaxial therewith, said brake shoe and brake drum being mounted for relative rotary movement about the axis of the said shoe and drum, brake applying means connected to said brake shoe to move said shoe into engagement with said drum, and means responsive to one direction of rotation connected to said drum to make the brake self-energizing and responsive to the other direction of rotation to make the brake nonself-energizing.

11. An aircraft propulsion power plant comprising, in combination, an engine; a propeller; a releasable clutch coupling the engine to the propeller for power transmission; a propeller brake coupled directly to the propeller and coupled to the engine through the clutch when the clutch is engaged; the brake including means for applying the brake and a fluid motor operable to release the brake; a pump connected to the motor for supplying fluid thereto to release the brake; first driving means coupling the propeller to the pump operable to drive the pump when the propeller is rotating; and second driving means coupling the engine to the pump operable to drive the pump when the engine is rotating.

12. An aircraft propulsion power plant comprising, in combination, an engine; a propeller; a releasable clutch coupling the engine to the propeller for power transmission; a propeller brake coupled directly to the propeller and coupled to the engine through the clutch when the clutch is engaged; the brake including means biasing the brake to engaged condition and a hydraulic motor operable to overcome the biasing means and release the brake; a pump connected to the motor for supplying fluid thereto to release the brake; first driving means coupling the propeller to the pump operable to drive the pump when the propeller is rotating; and second driving means coupling the engine to the pump operable to drive the pump when the engine is rotating.

13. An aircraft propulsion power plant comprising, in combination, an engine; a propeller driven thereby; a propeller brake coupled directly to the propeller; the brake including means biasing the brake to engaged condition and an expansible-chamber hydraulic motor operable to overcome the biasing means and release the brake, the hydraulic motor being coupled to the propeller for rotation therewith; and means connected to the motor for supplying fluid thereto to release the brake; the propeller having a normal rotational speed range above a predetermined value in flight, and the dimensions of the motor being such that rotation of the motor by the propeller when the propeller is rotating within the normal speed range generates by centrifugal action on the hydraulic fluid therein sufficient force to overcome the biasing means and hold the brake released.

14. An aircraft propulsion power plant comprising, in combination, an engine; a propeller; a releasable clutch coupling the engine to the propeller for power transmission; a propeller brake coupled directly to the propeller and coupled to the engine through the clutch when the clutch is engaged; the brake including means biasing the brake to engaged condition and an expansible-chamber hydraulic motor operable to overcome the biasing means and release the brake, the hydraulic motor being coupled to the propeller for rotation therewith; a pump connected to the motor for supplying fluid thereto to release the brake; first driving means coupling the propeller to the pump operable to drive the pump when the propeller is rotating; and second driving means coupling the engine to the pump operable to drive the pump when the engine is rotating; the propeller having a normal rotational speed range above a predetermined value in flight, and the dimensions of the motor being such that rotation of the motor by the propeller when the propeller is rotating within the normal speed range generates by centrifugal action on the hydraulic fluid therein sufficient force to overcome the biasing means and hold the brake released.

15. An aircraft propulsion power plant comprising, in combination, an engine; a featherable propeller driven thereby; a propeller brake coupled directly to the propeller; the brake including means biasing the brake to engaged condition and a hydraulic motor operable to overcome the biasing means and release the brake; a pump connected to the motor for supplying fluid thereto to release the brake; and driving means coupling the propeller to the pump operable to drive the pump when the propeller is rotating; the frictional torque of the brake due to the biasing means being sufficient to hold the propeller at flight speeds when it is feathered but insufficient to hold the propeller at flight speeds when it is unfeathered.

16. An aircraft propulsion power plant comprising, in combination, an engine; a featherable propeller; a releasable clutch coupling the engine to the propeller for power transmission; a propeller brake coupled directly to the propeller and coupled to the engine through the clutch when the clutch is engaged; the brake including means biasing the brake to engaged condition and a hydraulic motor operable to overcome the biasing means and release the brake; a pump connected to the motor for supplying fluid thereto to release the brake; first driving means coupling the propeller to the pump operable to drive the pump when the propeller is rotating; and second driving means coupling the engine to the pump operable to drive the pump when the engine is rotating; the frictional torque of the brake due to the biasing means being sufficient to hold the propeller at flight speeds when it is feathered but insufficient to hold the propeller at flight speeds when it is unfeathered.

17. An aircraft propulsion power plant comprising, in combination, an engine; a featherable propeller; a releasable clutch coupling the engine to the propeller for power transmission; a propeller brake coupled directly to the propeller and coupled to the engine through the clutch when the clutch is engaged; the brake including means biasing the brake to engaged condition and an expansible-chamber hydraulic motor operable to overcome the biasing means and release the brake, the hydraulic motor being coupled to the propeller for rotation therewith; a pump connected to the motor for supplying fluid thereto to release the brake; first driving means coupling the propeller to the pump operable to drive the pump when the propeller is rotating; second driving means coupling the engine to the pump operable to drive the pump when the engine is rotating; the frictional torque of the brake due to the biasing means being sufficient to hold the propeller at flight speeds when it is feathered but insufficient to hold the propeller at flight speeds when it is unfeathered; the propeller having a normal rotational speed range above a predetermined value in flight, and the dimensions of the motor being such that rotation of the motor by the propeller when the propeller is rotating within the normal speed range generates by centrifugal action on the hydraulic fluid therein sufficient force to overcome the biasing means and hold the brake released.

18. In a propeller drive, a featherable propeller including means operable to overfeather the propeller, drive mechanism connected to said propeller to rotate said propeller, a brake connected to said propeller drive mechanism to stop rotation of said propeller and brake applying means operatively connected to said brake to apply said brake, the brake being of a self-energizing type self-energizing in response to reverse rotation of said propeller.

References Cited in the file of this patent

UNITED STATES PATENTS

| | | |
|---|---|---|
| 852,587 | Towler | May 7, 1907 |
| 1,651,800 | Bennett et al. | Dec. 6, 1927 |
| 1,680,672 | Fawick | Aug. 14, 1928 |
| 2,099,750 | Peo et al. | Nov. 23, 1937 |
| 2,144,423 | Caldwell | Jan. 17, 1939 |
| 2,344,083 | Freitag et al. | Mar. 14, 1944 |
| 2,380,889 | Waseige | July 31, 1945 |
| 2,575,765 | Nabstedt et al. | Nov. 20, 1951 |
| 2,581,320 | Burton et al. | Jan. 1, 1952 |
| 2,702,100 | Montieth | Feb. 15, 1955 |

FOREIGN PATENTS

| | | |
|---|---|---|
| 109,132 | Australia | Nov. 16, 1939 |